United States Patent
Hirose

[11] 3,924,933
[45] Dec. 9, 1975

[54] ANAMORPHOTIC LENS SYSTEM
[75] Inventor: Ryusho Hirose, Tokyo, Japan
[73] Assignee: Canon Kabushiki Kaisha, Japan
[22] Filed: Nov. 15, 1973
[21] Appl. No.: 416,057

[30] Foreign Application Priority Data
Nov. 17, 1972  Japan............................... 47-115427

[52] U.S. Cl.................................. 350/181; 350/184
[51] Int. Cl.².......................................... G02B 13/08
[58] Field of Search............................. 350/181, 184

[56] References Cited
UNITED STATES PATENTS

| | | | |
|---|---|---|---|
| 3,512,872 | 5/1970 | Lynch et al........................... | 350/184 |
| 3,517,984 | 6/1970 | Lindstedt et al..................... | 350/181 |
| 3,524,696 | 8/1970 | Higuchi............................... | 350/184 |
| 3,682,533 | 8/1972 | Vetter.................................. | 350/184 |
| 3,705,759 | 12/1972 | Cook et al. ......................... | 350/184 |
| 3,751,136 | 8/1973 | Kirchhoff............................. | 350/181 |

*Primary Examiner*—Saxfield Chatmon, Jr.
*Attorney, Agent, or Firm*—Toren, McGeady and Stanger

[57] ABSTRACT

Anamorphotic lens systems for cinematography and in particular to front anamorphotics with a zoom lens for cinematographic cameras or projectors which is arranged to provide optical images with a wide angular field of view and a high relative aperture while still maintaining high grade imaging performance throughout the entire zooming range.

8 Claims, 10 Drawing Figures

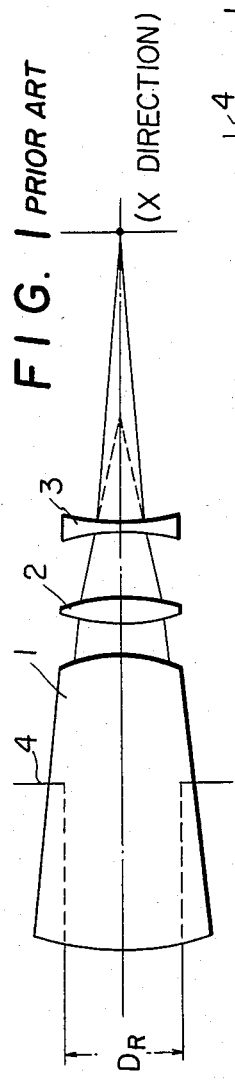
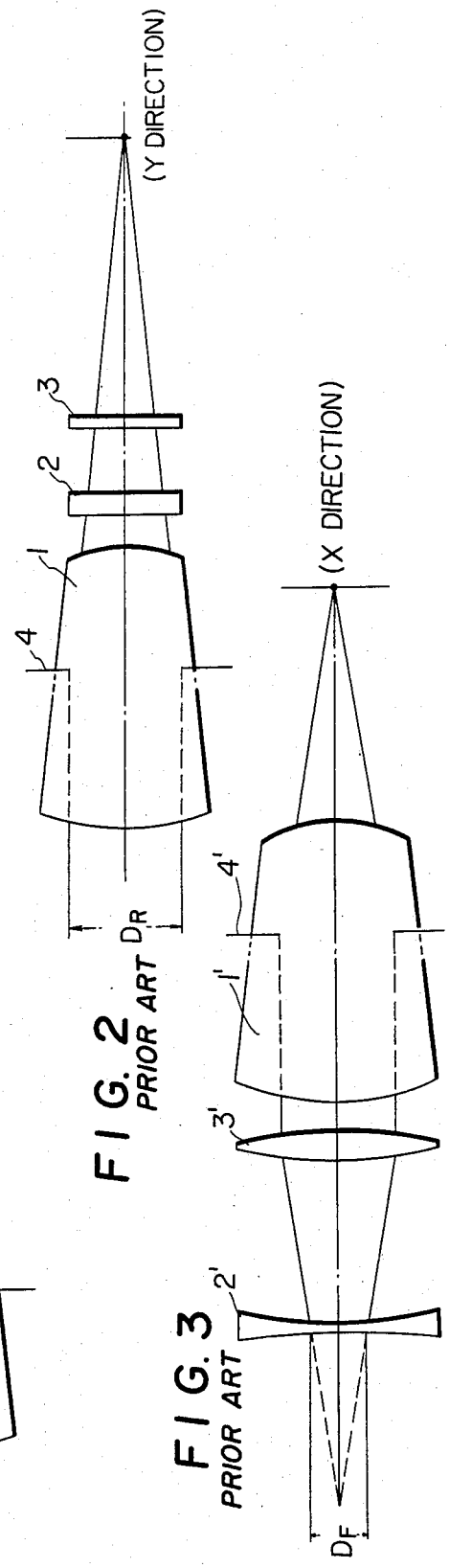
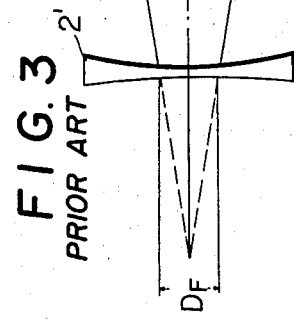
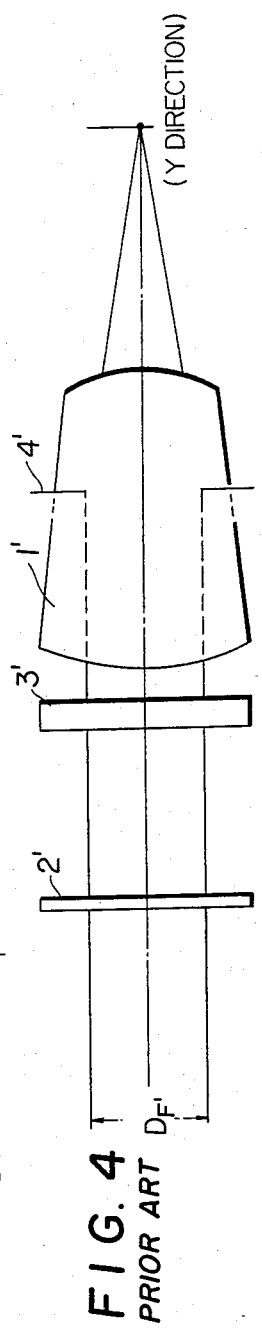

ANAMORPHOTIC LENS SYSTEM

BACKGROUND OF THE INVENTION

This invention relates to anamorphotic lens systems for cinematography and in particular to front anamorphotics with a zoom lens for cinematographic cameras or projectors which is arranged to provide optical images with a wide angular field of view and a high relative aperture while still maintaining high grade imaging performance throughout the entire zooming range.

There have been previously developed various types of anamorphotic lens systems which employ a monofocal lens as the master lens, while in the anamorphotic zoom lens, rear anamorphotic lens configuration has been employed at a conscious sacrifice to high grade imaging performance from the point of view of keeping the weight and bulk of the complete lens system within easily manageable proportions. Of these rear anamorphotic zoom lens systems, only the anamorphotics of the type in which a cylindrical lens is disposed between the rear vertex of the zoom lens and its back focus has so far been developed, and U.S. Pat. application Ser. No. 398,553 filed Sept. 18, 1973, has achieved an advance in the prior art for the improvement of imaging performance while maintaining the advantages of the rear anamorphotics.

BRIEF SUMMARY OF THE INVENTION

The present invention is directed particularly toward a further improvement in the preservation of high grade imagery and the form and arrangement and construction of the lens elements which constitute a novel anamorphotic lens system.

Accordingly, it is a general object of the present invention to provide an anamorphotic lens system having a wide angular field of view and a high relative aperture ratio so required for cinematography while high grade imagery is preserved throughout the entire range of object distances.

DETAILED DESCRIPTION OF THE INVENTION

For the purposes of facilitating the understanding of the features of the invention in contrast to those of the prior art, discussion about how the accomplishment of an anamorphotic zoom lens system having a wide angular field and a high relative aperture ratio is made which is one of the objects of the invention as mentioned above will be conducted in two phases: (1) The type of anamorphotics which facilitates the development of anamorphotic zoom lens systems with high relative aperture ratio, and (2) The type of anamorphotics which facilitates the development of anamorphotic zoom lens systems of wide angle, with reference to the accompanying drawings in which:

FIGS. 1 and 2 are schematic illustrations of a prior art rear anamorphotic zoom lens system to illustrate the refracting performances of the lens elements in the X direction perpendicular to the generating line of the cylindrical lens elements and in the Y direction (viz. in the direction of the generating line of the cylindrical lens elements) respectively.

FIGS. 3 and 4 are schematic illustration of a prior art front anamorphotic zoom lens system with cylindrical lens elements spaced in front of a master lens of zoom type to illustrate the principles of the front anamorphotics in the X and Y directions respectively.

Figure 5A:
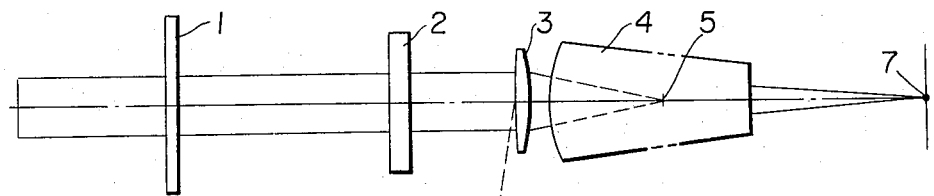

[1] On the anamorphotic lens configuration for the most suitable design of anamorphotic zoom lens systems with high relative aperture ratio.

Referring now to FIGS. 1 and 2 wherein a rear anamorphotic zoom lens system of the known type is illustrated as comprising a spherical master lens group of elements 1, a cylindrical convex lens element 2, a cylindrical concave lens element 3 and an entrance pupil 4 of a diameter, $D_R$. In this system, F-number components in the X and Y directions and the anamorphosis ratio are given respectively by the formulae (1), (2) and (3).

$$f'/D_R = FX \qquad (1)$$
$$f/D_R = FY \qquad (2)$$
$$f'/f = m \qquad (3)$$

wherein $f'$ is in correspondence with $f$; $f$ is the focal length of a lens combination of the zoom lens group set at a certain zooming position and the cylindrical lens elements in the direction of the generating line of the cylindrical lens elements; $D_R$ is the diameter of the entrance pupil occurring when the zoom lens group is set at the said zooming position; $f'$ is the overall focal length effected with the sum of the refractive powers of the zoom lens group set at the said zooming position and the X-direction component of refractive power of the cylindrical lens elements.

Hence from equations (1), (2) and (3), we have the apparent F-number of the rear anamorphotic zoom lens system as a whole (equivalent to an average F-number of the components $F_X$ and $F_Y$) given by the formula (4)

$$F = \sqrt{m} \, F_X \qquad (4)$$

Suppose that a zoom lens group with an apparent F-number of, for example, 1 : 2.5 is selected for employment in the master lens group of a rear anamorphotic zoom lens system having an anamorphosis ratio of 1 : 2. In this case, the F-number components of the rear anamorphotic zoom lens system in question are 1 : 5 and 1 : 2.5 in X and Y directions respectively. Thus, the average F-number is calculated being F/3.5. It follows that in order to produce an anamorphotic zoom lens system having F/3.5, a zoom lens group covering a relative aperture ratio in F-number of as high as F/2.5 has to be selected for employment in the master lens group. This disadvantageous result is effected by the elongation of the focal length in the X direction relative to that in the Y direction in accordance with the anamorphosis ratio irrespective of the constant diameter of the entrance pupil.

Unlike the circular entrance pupil of the rear anamorphotic zoom lens system, in a front anamorphotic zoom lens system illustrated in FIGS. 3 and 4 as comprising a spherical master lens group of elements 1', a cylindrical concave lens element 2', a cylindrical convex lens element 3', and an entrance pupil 4', the entrance pupil is of an ellipse with a minor axis $D_F$ and a major axis $D_{F'}$ in the X and Y directions respectively, so that F-number component in X direction:
$$f/D_F \qquad (5)$$

F-number component in Y direction:
$$f'/D_{F'} = mf/mD_F = f/D_F \qquad (6)$$

It follows that in order to produce a front anamorphotic zoom lens system having F/3.5, the master lens group of zoom type also may be of F/3.5.

By comparison with the front anamorphotics, it should be explained that the employment of the rear anamorphotics causes the master lens group with a higher relative aperture to be selected to effect the equivalent F-number inasmuch as the lens system in question is either of the front anamorphotics or of the rear anamorphotics, and that this disadvantage is increased with increase in the anamorphosis ratio provided that the increased relative aperture ratio is preserved. From the foregoing, it will be appreciated that an advantage of providing anamorphotic zoom lens systems with high relative aperture is derived from the introduction of the front anamorphotics rather than that of the rear anamorphotics as far as the relative aperture is concerned.

[2] On the application of the rear anamorphotics to wide angle anamorphotic zoom lens systems.

In order to improve lens performance, it is known that the refractive power of each of the cylindrical lens elements as well as the other lens elements is necessarily made as weak as possible, or otherwise, the lens element having the stronger refractive power affects image aberrations the more seriously, contributing a reduction of lens performance to the complete lens system.

Referring again to FIGS. 1 and 2, the rear anamorphotics of the type which permits the cylindrical lens to be disposed between the rear vertex of the zoom lens group and the back focus serves to the improvement of imaging performance since the longer the backfocus of the master lens group is the weaker the refractive power of the cylindrical lens may be made. However, so long as the lens mounting is subject to mechanical interference which restricts increase in dimensions of the lens element, it is to be understood that the refractive powers of the cylindrical lens elements cannot be lessened as desired.

In other words, in increasing the angular field of the zoom lens group, the increased back focus creates difficult problems such as increase in dimensions of the rear lens element as can be seen from the image-forming light pathes. The increase in dimensions of the rear lens element is minimized as the diaphragm is positioned as near the focal plane as possible. But in this case, the diameter of the front lens element is exceedingly increased. Thus the minimization of the size of the cylindrical lens itself causes an increase in the size of the complete lens system so that the advantage of the rear anamorphotic lens configuration is not satisfied in the point that the weight and bulk of the complete lens system is kept within easily manageable proportions.

Under such situations, the rear anamorphotics has so far been employed in only the zoom lens systems. Moreover, their relative apertures are limited to F/4.5 – F/5.6 from the point of view of imaging performance, and their angular field of views are only so chosen as to cover the focal length made equal to about diagonal of the film frame. From the foregoing, it will be understood that the rear anamorphotics of the conventional type is not suited for the accomplishment of any anamorphotic zoom lens system having wide angular field and high relative aperture in the points of the improvement of imaging performance and the minimization of the weight and bulk of the complete lens system.

[3] On the application of the front anamorphotic configuration to zoom lens systems and what problems arise thereupon;

As stated before, the employment of the front anamorphotic configuration is favorable for the design of high relative aperture anamorphotic zoom lens systems. Further the front anamorphotics is more advantageous in providing wide angle anamorphotic zoom lens systems than the rear anamorphotics at least in the following point. While in the rear anamorphotic configuration, the master lens having the property of $f = 20 - 200$mm, F/2.5 in the Y direction of the cylindrical lens functions as having $f = 40 - 400$mm, F/5.0 in the X direction, so that a zoom lens of $f = 20 - 200$mm, F/2.5 is necessary for use as the master lens. In this case, the anamorphotic ratio is 1 : 2, and according to the customary specification, the anamorphotic lens system in question has $f = 40 - 400$mm, F/3.5 as an average F-number of X- and Y-direction components. The application of the front anamorphotics to a zoom lens system of the same specification as above permits the use of a cylindrical lens of the effect.

$f = 20 - 200$mm F/3.5 in X direction
$f = 40 - 400$mm F/3.5 in Y direction inasmuch as a zoom lens having $f = 40 - 400$mm, F/3.5 is selected for employment in the master lens, whereby the cylindrical lens has the property of a wide angle converter which changes the magnification of the master lens by a factor of 0.5 in X direction with a constant relative aperture ratio of F/3.5.

Still another advantage of the front anamorphotic zoom lens system is that unlike the rear anamorphotic zoom lens system, the lens mounting is not subject to the limitation of mechanical interference, and that the refractive power of the cylindrical lens can be freely chosen for achievement of the desired standard of imaging performance. Therefore, the front anamorphotic configuration can be said to be more suitable for the construction of wide angle anamorphotic zoom lens systems than the rear anamorphotic configuration.

This is valid in aberration correction. As discussed by C. G. Wynne in Proceeding of Physics Society (no. 1, July 1956), for correction of aberrations of cylindrical lens up to third order aberrations, sixteen aberration coefficients must be taken into account. However, so long as the cylindrical lens is afocal, the anamorphotic lens system in question when focussed at infinity is subject to correction for only six aberration coefficients. This situation agrees with the experience. The anamorphotic lens system of the instant type in which an afocal anamorphotic lens member is spaced in front of the imaging lens is well corrected for spherical aberrations and comma aberrations so long as it is focussed for object at infinity, the improvement of imaging performance being superior by several grades to that effected in the anamorphotic lens system of the conventional type in which the cylindrical lens is positioned between the rear vertex of the zoom lens group and the back focus as also disclosed in our copending patent application Ser. No. 398,553.

As to the correction for field curvature, the better the correction, the farther from the cylindrical lens is positioned the pupil. In the case of wide angle anamorphotic zoom lens systems, the wider the angular field of view, the more important is the position of the pupil, so that the application of the front anamorphotic configuration to the zoom lens system is advantageous in providing high grade of imaging performance while still maintaining the high relative aperture.

The application of the prior art front anamorphotic lens configuration to zoom lens systems will next be discussed. Conventionally the front anamorphotic lens configuration is embodied in fixed focal length lens systems with various modifications, but not in varifocal lens systems, because (1) The focussing mechanism is complicated; (2) Although aberrations in the Y direction is equivalent to those of the zoom lens, the stability of aberrations with zooming cannot be effected due to the front anamorphotics having the property of a wide converter in the X direction. In other words, the front anamorphotics may be attached to a zoom lens set a a zooming position, for example, the wide angle position, but the variation of aberrations during zooming cannot be well compensated for; (3) The anamorphotic ratio is varied during focussing. (which will be described in connection with FIG. 5); and (4) The cylindrical lens positioned in front of the spherical zoom lens unavoidably increases the size of the complete lens system.

With the foregoing general object, advantages and results in view as well as certain others which will be aparent from the following description, the present invention has developed an anamorphotic zoom lens system having a wide angular field and a high relative aperture with certain novel features in design, construction and arrangement of lens elements as will be more particularly referred to and specified hereinafter. As a further elucidation, the conventional type front anamorphotic lens configuration has two major drawbacks in application to zoom lens systems, that is, (1) the complicated focussing mechanism is necessary, and (2) the anamorphosis ratio is varied in accordance with the object distance as mentioned before in connection with the several other reasons. The novel features of the present invention will now described with further reference to the accompanying drawings in which:

FIGS. 5A, 5B, 5C and 5D are schematic illustrations of a front anamorphotic zoom lens system in accordance with the present invention focused at two operational positions for infinite object and a close object to illustrate the focussing principles in the X and Y directions respectively.

Figure 6:
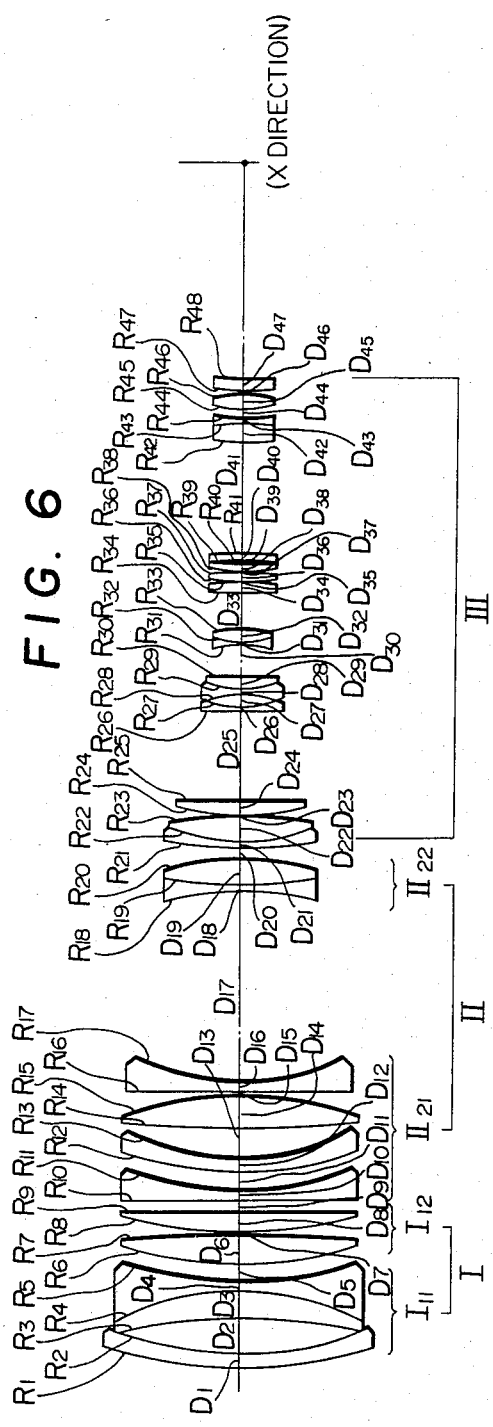
Figure 7:
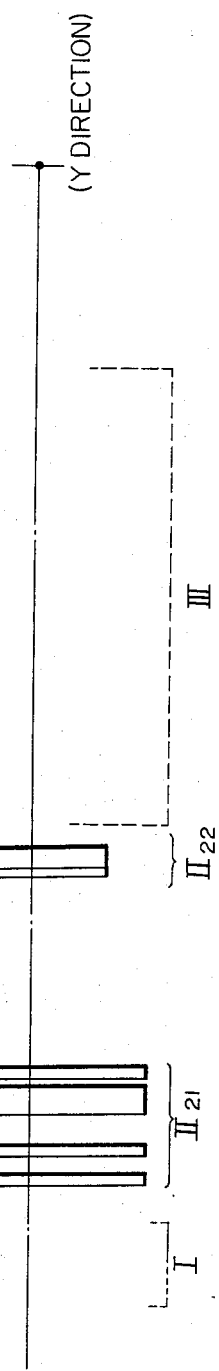

FIG. 6 is an optical diagrams showing one example of a practical embodiment of the front anamorphotic zoom lens system according to the present invention in one operational position taken in the X direction, and FIG. 7 is a fragmentary optical diagram of the lens system in FIG. 6 taken in the Y direction.

PREFERRED EMBODIMENT OF THE INVENTION

As illustrated in FIGS. 6 and 7, an anamorphotic lens system of the zoom type according to the present invention comprises an afocal lens group I, an afocal cylindrical lens group II and a zoom lens group III, said group I being divided into two parts $I_{11}$ and $I_{12}$, and said group II also being divided into two parts $II_{21}$ and $II_{22}$. The provision for focussing is made at three distinct parts, i.e., one of the divergent and convergent parts of Group I spaced in front of the afocal anamorphotic lens group II, one of the parts of Group II, and a front member of Group III.

To effect focussing to suit differing object positions, Group I is so constructed as being characterized by the following relationship (101)

$$|f_2| - |f_1| = e \qquad (101)$$

wherein $f_1$ is the focal length of front part $I_{11}$; $f_2$ is the focal length of rear part $I_{12}$; and $e$ is the distance between the principal points of parts $I_{11}$ and $I_{12}$. Under this condition, an afocal lens for focussing is realized.

When it is not satisfied, the object point with respect to the cylindrical lens group II (viz. the image point of group I) is not at infinity but at a finite distance, so that Group II will lose its afocal function provided for improving image quality which is one of the objects of the present invention.

Another focussing provision is made in Group II so that Group II functions during zoom movement of a zooming member of Group III to compensate for X- and Y-direction image component shift errors relative to each other as illustrated in FIG. 5, wherein the front anamorphotic lens system of the zoom type comprises a cylindrical concave lens element 1, a cylindrical convex lens element 2 movable for focussing, a focussing spherical lens element 3 of a zoom lens group, and the other spherical lens element of the zoom lens group 4. Numerals 5, 6 and 7 indicate respectively an image point of the focussing lens 1, a close object, and a focal plane.

Figure 5B:
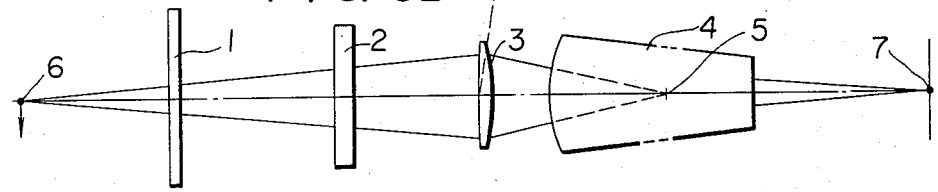
Figure 5C:
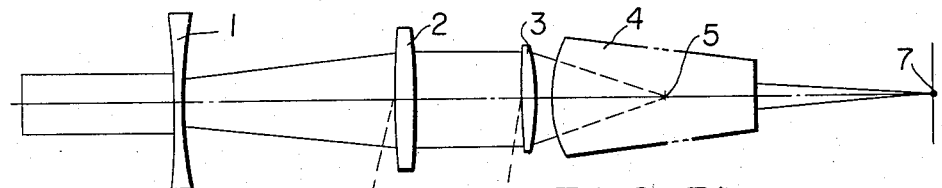
Figure 5D:
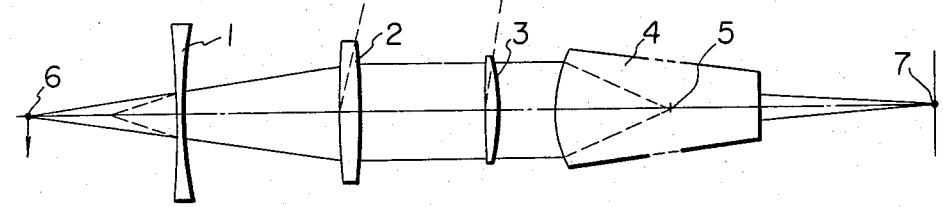

FIGS. 5A and 5B illustrate Y-direction image-forming light paths in the lens system set at infinity object and at a close object respectively. FIGS. 5C and 5D illustrate X-direction image-forming light paths of the lens system set at infinit object and at a close object respectively. As the object distance decreases from infinity for which the focussing is effected in the both directions, an image shift is caused to occur of which the Y-direction component can be compensated for the axial movement of the focussing member of Group III, but the X-direction image shift component cannot be compensated for by the said movement alone. According to the present invention, therefore, the cylindrical lens group II is split into a divergent front part and convergent rear part, or vice versa, of which of one part, for example, the convergent rear part is movable for focussing to compensate for the difference between the X- and Y-direction image shift components, thereby the air space between the two parts is varied to vary the anamorphosis ratio in accordance with the object distance. In prior art, these situations, that is, the variation of anamorphosis ratio with the object distance, and the necessity of two focussing mechanism sections for the movements of part of the spherical lens group and part of the cylindrical lens group as illustrated in FIG. 5 have so far prevented the application of the front anamorphotic configuration to zoom lens systems.

The construction of the cylindrical lens group II consisting of two parts $II_{21}$ and $II_{22}$ in accordance with the invention is characterized by the following relationships:

$$\begin{aligned}(a)\; & f_{2'} - |f_{1'}| = e' \\ (b)\; & f_{1'} < 0 \\ (c)\; & f_{2'} \cdot \mathit{lf}_{1'} = m \end{aligned} \qquad 102$$

wherein $f_{1'}$ is the focal length of part $II_{21}$; $f_{2'}$ is the focal length of part $II_{22}$; $e'$ is the distance between the principal points of parts $II_{21}$ and $II_{22}$; and $m$ is the anamorphosis ratio.

Under condition 102a, an afocal cylindrical lens is realized, and under condition 102b the cylindrical lens is allowed to have the property of a wide converter in the X direction. If the cylindrical lens group is not afocal, a high standard of correction for spherical and coma aberrations cannot be achieved as mentioned before. Condition 102 is made effective in combination with condition 101.

Under condition 102b, a wide angle anamorphotic zoom lens system can be realized because the cylindrical lens group has the property of a wide converter in the X direction. If $f_{1'} > 0$, then the cylindrical lens is a teleconverter, so that a zoom lens group with a larger angular field of view than in the case of $f_{1'} < 0$ must be provided in place of the master lens to effect equivalent angular field of view in the complete lens system. This leads to the necessity of scaling up the cylindrical lens group itself. Moreover, the increased focal length of the master lens group causes the aberrations ascribable to the anamorphotic group to become larger than in the case of $f_{1'} < 0$, with the result of a lowered standard of image quality.

Conditions 102a and 102b in combination facilitate the minimization of the weight and bulk of the wide angle anamorphotic zoom lens system of the front anamorphotic lens configuration to such an extent as to stand with the possibility of minimization of the rear anamorphotic lens system. In the latter connection, it should be explained that when the prior art rear anamorphotic lens configuration is applied to wide angle anamorphotic zoom lens systems, the back focus is necessarily increased with decrease in the refractive power of the cylindrical lens for the purpose of preserving a high standard of imagery as mentioned before, and conversely for the improvement of image quality, the refractive power of the zoom lens group must be weakened to cause the minimization of the complete lens system to be made difficult thereby. Further, the complexity of the focussing mechanism which is a drawback of the prior art front anamorphotic lens configuration can be minimized by the employment of such a lens configuration as to satisfy the condition 101.

Aside from its inapplicability to zoom lens systems, the prior art front anamorphotic lens configuration is not capable of stabilizing aberrations with zooming. In the present invention, the cylindrical lens group which is split into two divergent and convergent parts under condition 102 is further characterized by the following feature:

The divergent part is constructed as comprising at least one convex meniscus lens element and one cylindrical lens element with at least one surface of convexity . . . (103)

This feature (103) is particularly important for a wide angle anamorphotic zoom lens system, and facilitates the correction for distortion in the cylindrical lens group. When this condition 103 is not satisfied, the distortion in the X direction at the wide angle setting is seriously increased, being of barrel type, so that it cannot be balanced out by the suitable design of other lens elements without causing aberration variation to rapidly increase with zooming.

The foregoing description is mainly directed toward the anamorphotic zoom lens system including a zoom lens as the master lens. However, it is to be noted that the front anamorphotic lens configuration according to the present invention is applicable to the lens system in which the master lens is monofocal. In the latter connection, various solutions on the compensation for the variation of anamorphosis ratio with differing object distances which has already been described in connection with FIG. 5 have been proposed, as for example, in U.S. Pat. No. 2,890,622 using prism anamorphotics and in U.S. Pat. No. 3,682,533 which is concerned with the provision of a special device at the focussing member. However, these proposal cannot be said to completely compensate for the variation of anamorphosis ratio and image shift errors in X and Y directions.

In contrast to the prior proposals, the lens configuration in accordance with the present invention permits the rays of light incident upon the cylindrical lens to be made afocal by imparting a focussing movement to a member of the spherical front lens group, thereby the variation of anamorphosis ratio with differing object distances and the image shift differences between the X and Y direction components are perfectly compensated for.

An example of a specific lens system of the invention may be constructed in accordance with the numerical data given in the following table wherein the radii of curvature, R, the axial thicknesses or axial separation between glass elements, D, the refractive indices, Nd, with references to the spectral d line of sodium, and the dispersive indices, N, are all expressed in the conventional manner.

|    | R       | D              | Nd      | Vd   |
|----|---------|----------------|---------|------|
| 1  | 185.9   | 4.             | 1.71300 | 54.0 |
| 2  | 118.6   | 11.5           |         |      |
| 3  | −162.3  | 9.             | 1.74000 | 28.3 |
| 4  | −19.51  | 2.5            | 1.67000 | 57.4 |
| 5  | 137.48  | 2.662          |         |      |
| 6  | 147.3   | 10.            | 1.77250 | 49.6 |
| 7  | −291.9  | 0.2            |         |      |
| 8  | 176.4   | 6.             | 1.77250 | 49.6 |
| 9  | 332.76  | 2.5            |         |      |
| 10 | ∞       | 3.5            | 1.64000 | 60.2 |
| 11 | 98.43   | 6.15           |         |      |
| 12 | 139.5   | 3.5            | 1.71300 | 54.0 |
| 13 | 75.67   | 11.75          |         |      |
| 14 | 370.7   | 10.            | 1.68893 | 31.1 |
| 15 | −114.5  | 0.2            |         |      |
| 16 | 582.6   | 3.5            | 1.53113 | 62.4 |
| 17 | 71.014  | 66.291         |         |      |
| 18 | −102.4  | 3.5            | 1.54869 | 45.6 |
| 19 | 100.    | 8.             | 1.48749 | 70.1 |
| 20 | −58.799 | 3.5            |         |      |
| 21 | 350.    | 2.5            | 1.80518 | 25.4 |
| 22 | 69.5    | 7.5            | 1.60729 | 59.4 |
| 23 | −227.5  | 0.2            |         |      |
| 24 | 80.25   | 5.5            | 1.60729 | 59.4 |
| 25 | ∞       | Wide / Tele    |         |      |
| 26 | 375.    | 1.5            | 1.67000 | 57.4 |
| 27 | 38.4    | 5.75           |         |      |
| 28 | −51.5   | 1.5            | 1.67000 | 57.4 |
| 29 | 33.4    | 4.             | 1.75520 | 27.5 |
| 30 | 360.5   | Wide / Tele    |         |      |
| 31 | −49.    | 1.             | 1.80610 | 40.8 |
| 32 | 39.6    | 3.25           | 1.80518 | 25.4 |
| 33 | −98.7   | 3.             |         |      |
| 34 | −2041.2 | 2.5            | 1.55963 | 61.2 |
| 35 | −59.87  | 0.2            |         |      |
| 36 | 134.4   | 2.             | 1.55963 | 61.2 |
| 37 | −166.5  | 7.             |         |      |
| 38 | 61.92   | 3.             | 1.60729 | 59.4 |
| 39 | 228.5   | 2.             |         |      |
| 40 | −103.4  | 2.5            | 1.80518 | 25.4 |
| 41 | −298.6  | 37.85          |         |      |
| 42 | 88.6    | 7.             | 1.50137 | 56.4 |
| 43 | −73.37  | 1.5            | 1.80518 | 25.4 |
| 44 | 53.45   | 3.             |         |      |
| 45 | 78.81   | 5.             | 1.60729 | 59.4 |
| 46 | −68.305 | 4.5            |         |      |
| 47 | 118.4   | 4.             | 1.58913 | 61.1 |
| 48 | 484.8   |                |         |      |

What is claimed is:
1. An anamorphotic-type lens system in which a master lens is positioned in rear of a cylindrical lens, which system comprises an afocal spherical lens group for focussing, an afocal anamorphotic cylindrical lens group and a master lens group of the zoom type coaxially arranged in this order from the front, said spherical lens group and said enamorphotic cylindrical lens group each being divided into two parts and satisfying the following relationship in combination:

$$||f_2| - |f_1| = e f_{1'} \quad < 0 f_{2'} - |f_{1'}| = e'$$

wherein $f_1$ is the focal length of the front part of the spherical lens group; $f_2$ is the focal length of the rear part of the spherical lens group; $e$ is the distance between the principal points of the both parts; $f_{1'}$ is the focal length of the front divergent part of the cylindrical lens group; $f_{2'}$ is the focal length of the rear convergent part of the cylindrical lens group; and $e'$ is the distance between the principal points of the both lens parts.

2. An anamorphotic lens system as described in claim 1 wherein said front divergent part of said cylindrical lens group cmprises at least one negative meniscus lens member and one double convex.

3. An anamorphotic-type lens system comprising the following lens systems arranged in order from the object side:
   a focusing lens system, said focusing lens system being substantially afocal and having a plurality of lens groups, at least one lens group being movable to focus on an object;
   an anamorphotic cylindrical lens system, said system being substantially afocal and constructed as an inverse telescopic system; and
   an image forming lens system, said image forming system being a zoom lens and including a convergent lens group, at least two movable lens groups and a relay lens.

4. The lens system as in claim 3 wherein said focusing lens group has a divergent lens group and a convergent lens group and said anamorphotic cylindrical lens system has, in the order from the object side, a divergent cylindrical lens system and a convergent cylindrical lens system.

5. The lens system as in claim 5, wherein said divergent cylindrical lens group of said anamorphotic lens system includes at least one negative meniscus lens and at least one equi-convex lens.

6. An anamorphotic-type lens system comprising the following lens systems arranged in order from the object side:
   a focusing lens system, said focusing lens system being substantially afocal and having a plurality of lens groups, at least one lens group being movable to focus on an object, said focusing lens group having a divergent lens group and a convergent lens group;
   an anamorphotic cylindrical lens system, said system being substantially afocal and constructed as an inverse telescopic system, said anamorphotic system having, in the order from the object side, a divergent cylindrical lens system and a convergent cylindrical lens system;
   an image forming lens system, said image forming system being a zoom lens and including a convergent lens group, at least two movable lens groups and a relay lens; and wherein said anamorphotic-type lens system has the following numerical parameters where R represents the radii of curvature, D represents the axial thicknesses or axial separation between glass elements, Nd represents the refractive indices with reference to the $d$ line of sodium and Vd represents the dispersive indices, all being expressed in conventional units, the lens elements being numbered from the object side:

| | R | D | Nd | Vd |
|---|---|---|---|---|
| 2 | 185.9 | 4. | 1.71300 | 54.0 |
| 3 | 118.6 | 11.5 | | |
| 4 | −162.3 | 9 | 1.74000 | 28.3 |
| 5 | −19.51 | 2.5 | 1.67000 | 57.4 |
| 6 | 137.48 | 2.662 | | |
| 7 | 147.3 | 10. | 1.77250 | 49.6 |
| 8 | −291.9 | 0.2 | | |
| 9 | 176.4 | 6. | 1.77250 | 49.6 |
| 10 | 332.76 | 2.5 | | |
| 11 | ∞ | 3.5 | 1.64000 | 60.2 |
| 12 | 98.43 | 6.15 | | |
| 13 | 139.5 | 3.5 | 1.71300 | 54.0 |
| 14 | 75.67 | 11.75 | | |
| 15 | 370.7 | 10. | 1.68893 | 31.1 |
| 16 | −114.5 | 0.2 | | |
| 17 | 582.6 | 3.5 | 1.53113 | 62.4 |
| 18 | 71.014 | 66.291 | | |
| 19 | −102.4 | 3.5 | 1.54869 | 45.6 |
| 20 | 100. | 8. | 1.48749 | 70.1 |
| 21 | −58.799 | 3.5 | | |
| 22 | 350. | 2.5 | 1.80518 | 25.4 |
| 23 | 69.5 | 7.5 | 1.60729 | 59.4 |
| 24 | −227.5 | 0.2 | | |
| 25 | 80.25 | 55 | 1.60729 | 59.4 |
| 26 | ∞ | Wide / Tele | | |
| 27 | 375. | 1.5 | 1.67000 | 57.4 |
| 28 | 38.4 | 5.75 | | |
| 29 | −51.5 | 1.5 | 1.67000 | 57.4 |
| 30 | 33.4 | 4. | 1.75520 | 27.5 |
| 31 | 360.5 | Wide / Tele | | |
| 32 | −49. | 1. | 1.80610 | 40.8 |
| 33 | 39.6 | 3.25 | 1.80518 | 25.4 |
| 34 | −98.7 | 3. | | |
| 35 | −2041.2 | 2.5 | 1.55963 | 61.2 |
| 36 | −59.87 | 0.2 | | |
| 37 | 134.4 | 2. | 1.55963 | 61.2 |
| 38 | −166.5 | 7. | | |
| 39 | 61.92 | 3. | 1.60729 | 59.4 |
| 40 | 228.5 | 2. | | |
| 41 | −103.4 | 2.5 | 1.80518 | 25.4 |
| 42 | −298.6 | 37.85 | | |
| 43 | 88.6 | 7. | 1.50137 | 56.4 |
| 44 | −73.37 | 1.5 | 1.80518 | 25.4 |
| 45 | 53.45 | 3. | | |
| 46 | 78.81 | 5. | 1.60729 | 59.4 |
| 47 | −68.305 | 4.5 | | |
| 48 | 118.4 | 4. | 1.58913 | 61.1 |
| | 484.8. | | | |

7. The lens system of claim 1 wherein said anamorphotic lens system includes a cylindrical concave lens element and a cylindrical convex lens element, said cylindrical convex lens element being movable for focusing.

8. An anamorphotic lens system as in claim 1, wherein said front divergent part of said cylindrical lens group comprises at least one negative meniscus lens and one plano-convex cylindrical lens.

* * * * *